(12) United States Patent
Hoffman et al.

(10) Patent No.: US 7,168,229 B1
(45) Date of Patent: Jan. 30, 2007

(54) DROP RATE CONTROL FOR AGRICULTURAL HEADER

(75) Inventors: Charles H. Hoffman, New Holland, PA (US); Robert L. Fackler, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/288,573

(22) Filed: Nov. 29, 2005

Related U.S. Application Data

(60) Provisional application No. 60/699,272, filed on Jul. 14, 2005.

(51) Int. Cl.
*A01D 67/00* (2006.01)

(52) U.S. Cl. .............................. 56/208; 60/469; 60/413

(58) Field of Classification Search .................. 56/208, 56/10.2 R, 209, 10.8, 10.2 A, 10.2 E; 60/469, 60/413; 414/641; 172/260.4, 260.5, 464
See application file for complete search history.

(56) References Cited

U.S. PATENT DOCUMENTS

| | | | |
|---|---|---|---|
| 3,605,391 A | 9/1971 | Schott et al. | |
| 4,335,561 A | 6/1982 | Swanson et al. | |
| 4,523,886 A * | 6/1985 | Reeves | 414/641 |
| 4,527,381 A * | 7/1985 | Mann | 56/209 |
| 4,622,803 A * | 11/1986 | Lech | 56/10.2 E |
| 4,676,053 A * | 6/1987 | Pruitt | 56/208 |
| 4,733,523 A * | 3/1988 | Dedeyne et al. | 56/209 |
| 4,862,165 A | 8/1989 | Gart | |
| 4,931,967 A | 6/1990 | Boe et al. | |
| 4,969,527 A | 11/1990 | Boe | |
| 4,979,092 A | 12/1990 | Bergene et al. | |
| 5,042,314 A | 8/1991 | Rytter et al. | |
| 5,320,186 A | 6/1994 | Strosser et al. | |
| 5,455,769 A | 10/1995 | Panoushek et al. | |
| 5,469,694 A | 11/1995 | Panousheck et al. | |
| 5,472,056 A | 12/1995 | Orbach | |
| 5,549,166 A | 8/1996 | Orbach et al. | |
| 5,613,352 A * | 3/1997 | Panoushek et al. | 56/10.2 E |
| 5,684,691 A | 11/1997 | Orbach et al. | |
| 5,713,190 A | 2/1998 | Vermeulen et al. | |
| 5,778,644 A * | 7/1998 | Keller et al. | 56/11.2 |
| 5,810,095 A | 9/1998 | Orbach et al. | |
| 5,899,279 A | 5/1999 | Bennett et al. | |
| 5,906,089 A * | 5/1999 | Guinn et al. | 56/10.2 E |
| 5,964,077 A * | 10/1999 | Guinn | 56/10.2 E |
| 5,983,615 A * | 11/1999 | Schmid et al. | 56/208 |
| 6,058,343 A | 5/2000 | Orbach et al. | |
| 6,105,679 A | 8/2000 | Schubert et al. | |
| 6,151,874 A * | 11/2000 | Eis | 56/10.2 E |
| 6,216,072 B1 | 4/2001 | Boe et al. | |
| 6,588,187 B2 | 7/2003 | Engelstad et al. | |
| 6,901,729 B1 | 6/2005 | Otto et al. | |

* cited by examiner

*Primary Examiner*—Árpád Fábián Kovács
(74) *Attorney, Agent, or Firm*—Stephen A. Bucchianeri; John William Stader; Michael G. Harms

(57) ABSTRACT

A method for controlling and modifying the drop rate of a header on an agricultural harvesting machine by providing a programmable electronic control unit capable of receiving operator input through an input device. The programmable electronic conrol unit generates output signals based on the operator input to raise and lower the header according to a corresponding output drop rate signal.

9 Claims, 5 Drawing Sheets

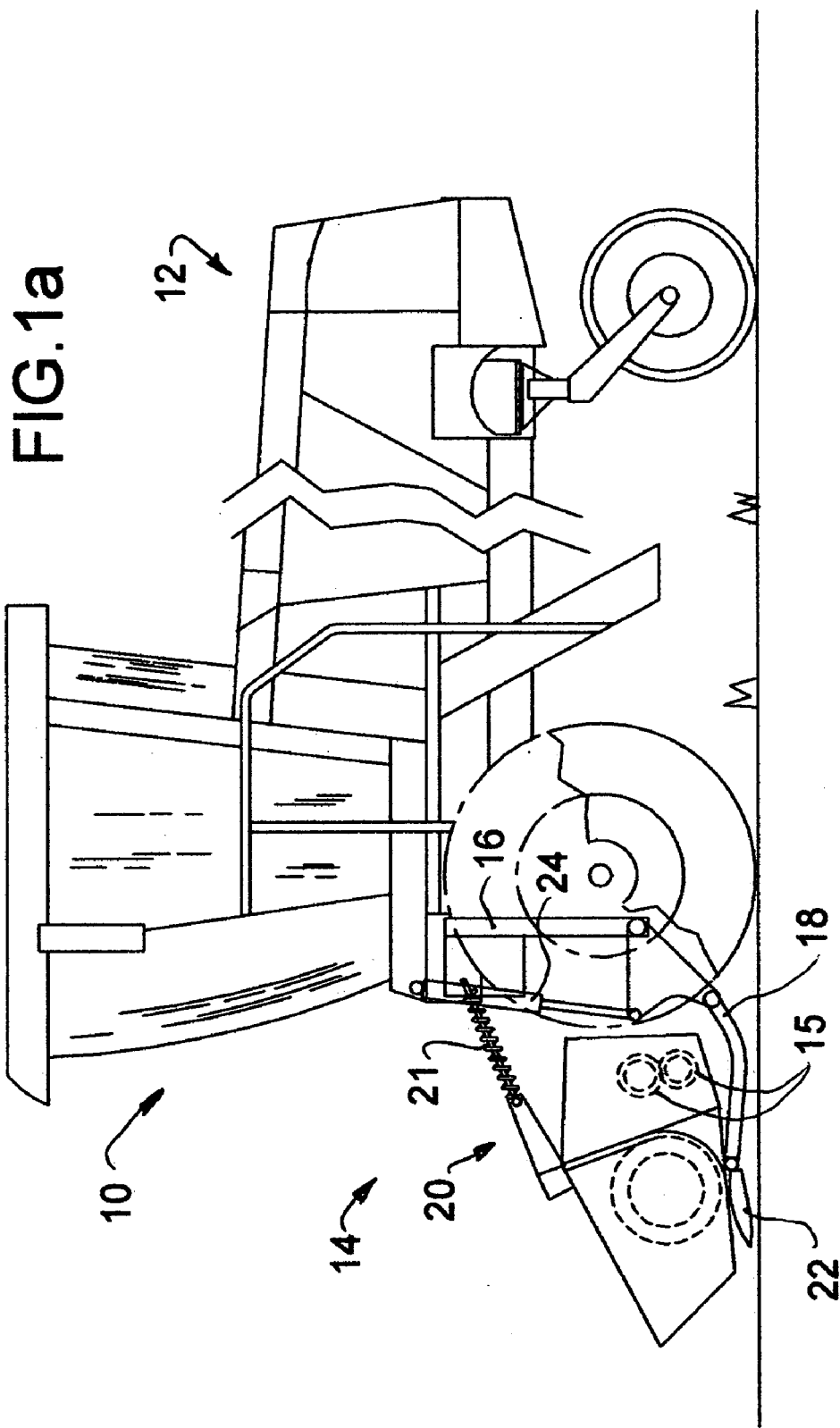

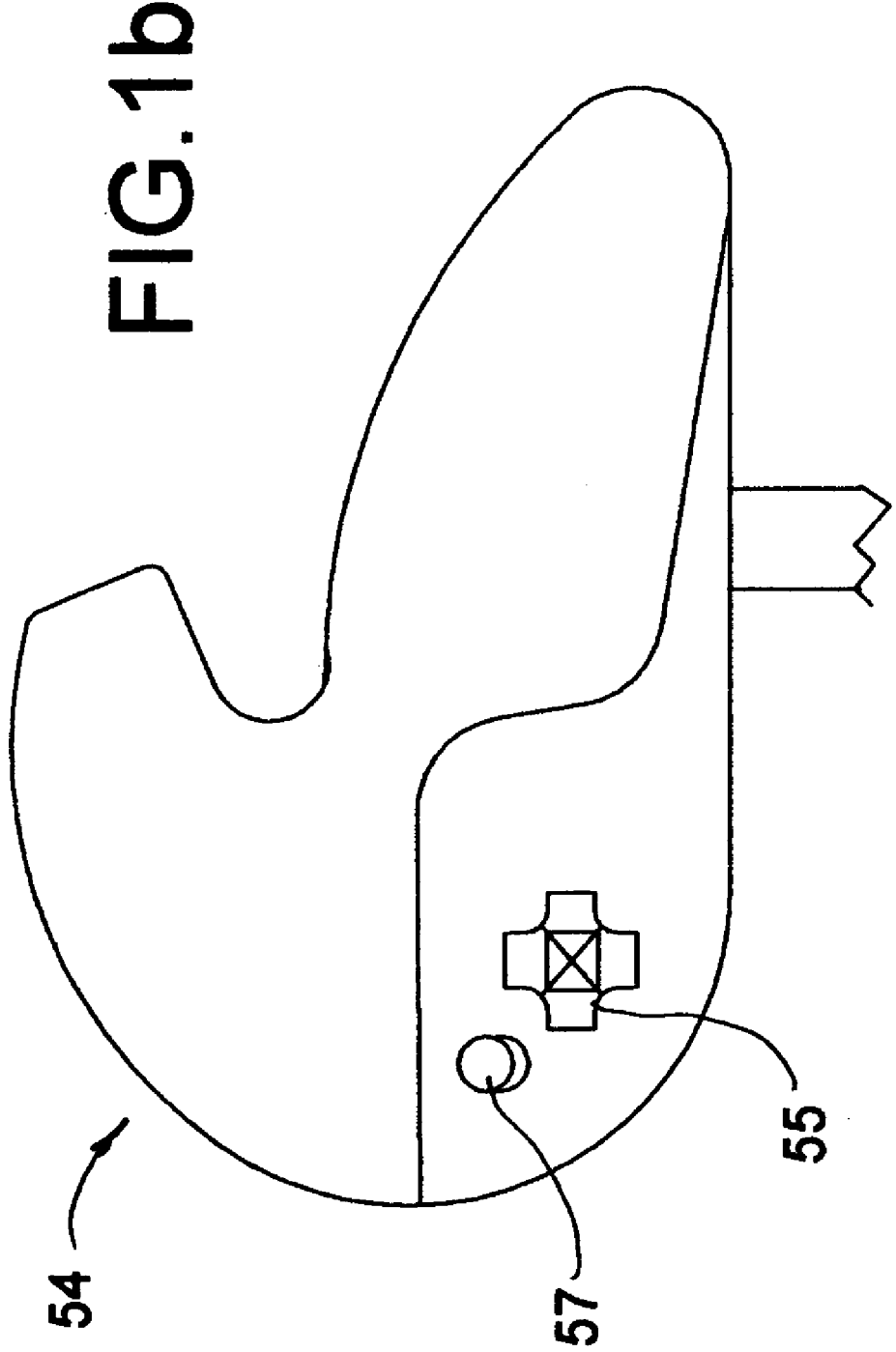

DROP RATE CONTROL FOR AGRICULTURAL HEADER

CROSS-REFERENCE TO RELATED APPLICATIONS

This application claims priority to U.S. Provisional Patent Application 60/699,272 entitled "Software Program for Managing the Drop Rate of a Windrower Header" filed on Jul. 14, 2005, in the name of the same entity as the present application

BACKGROUND OF THE INVENTION

The present invention relates to a control for managing the drop rate of a header on an agricultural implement and, more particularly, to such a control for the header on a windrower header.

Regulating the positioning of headers on agricultural harvesters using hydraulic and electro-hydraulic control systems is generally known in the industry, as shown in U.S. Pat. No. 6,901,729. The '729 patent describes a header flotation system which is referred to as "non-independent" in that each side of the header is supported by a single hydraulic cylinder, which perform both the flotation and lift functions. To accommodate unbalanced headers (center of gravity not centered between the lift arms), hydraulic oil is sent to the return side of the lift cylinder on the lighter side of the header, thus resulting in even raising, lowering and float.

It is not uncommon to use different headers for different crops or crop conditions on the same tractor unit, i.e., to change headers depending upon harvesting conditions. Different headers cause different drop rates owing to obvious variables such as weight, condition and type of seals, system friction, geometrics, aperture sizes, and the like. The interchangeability of headers and the incumbent changes in drop rate often results in inefficient drop rates.

Thus, it would be desirable, beneficial and advantageous to have a control system that may be "tuned" to the particular combination of header and tractor unit, thus maximizing operation efficiency and operator comfort.

SUMMARY OF THE INVENTION

Accordingly, it is an object of the present invention to provide an improved control arrangement for a header lift system that compensates for the above-noted disadvantages.

It is another object of the present invention to provide a method of tuning the drop rate of a header as required to maximize efficiency and operator comfort.

It is a further object of the present invention to provide a control system for adjusting the drop rate of a header in an agricultural harvesting implement.

It is a still further object of the present invention to provide a control system for adjusting the drop rate of a header that is durable in construction, inexpensive of manufacture, carefree of maintenance, facile in assemblage, and simple and effective in use.

These and other objects are achieved by providing a method for controlling and modifying the drop rate of a header on an agricultural harvesting machine.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1a is a partial side elevational view of a crop harvesting machine of the type with which the invention may be used, also showing a simplified side view of the lift and flotation system;

FIG. 1b is a rear elevational view of a multifunctional handle of the general type with which the present invention may be used;

DESCRIPTION OF THE PREFERRED EMBODIMENT

Figure 2:
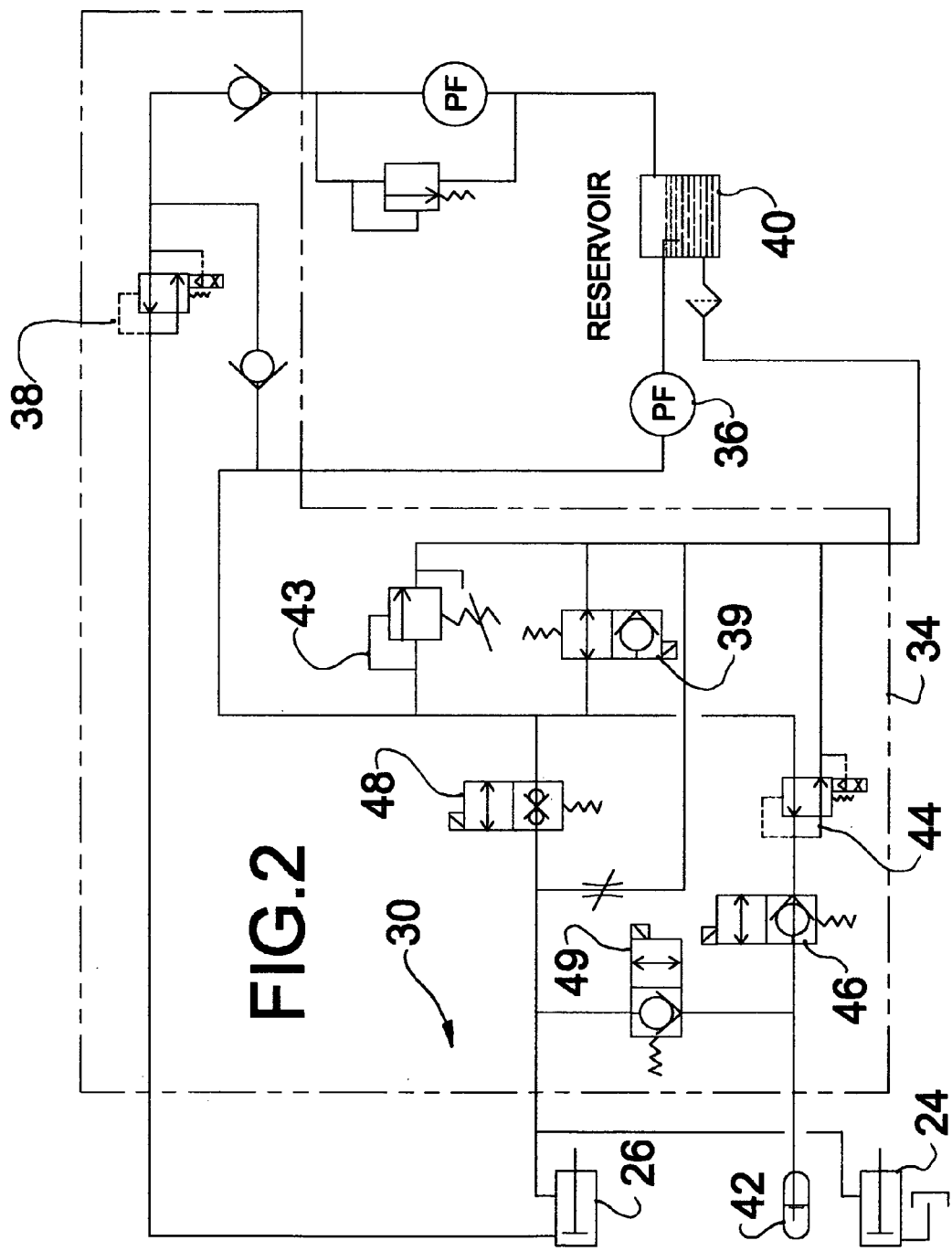
FIG. 2 is a schematic view of one embodiment of an exemplary hydraulic system.

Many of the fastening, connection, processes and other means and components utilized in the invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefor be discussed in significant detail.

FIG. 1a shows a self-propelled windrower 10 of the type with which the instant invention may be advantageously utilized. More specifically, the figures illustrate what is referred to as a "non-independent" flotation system such as shown in U.S. Pat. No. 6,901,729—the present invention works quite well with such a system. It will, however, be appreciated that the principles of the present invention are not limited in use to this particular machine, but may be used on many other harvesting machines with headers and with different flotation systems, such as the "dependent" flotation system shown in co-pending U.S. patent application Ser. No. 10/822,465.

In the illustrated embodiment, the self-propelled windrower 10 comprises a tractor 12 and a header 14, the header 14 being attached to the front end of the frame 16 or chassis of the tractor 12. The header may be of generally any suitable construction or design, and may include not only crop-harvesting mechanisms, but also crop conditioners such as elongate rolls 15. Such attachment of the header 14 to the frame 16 is achieved through a pair of lower arms 18 (only the left one being shown, the right being generally the same) pivoted at one end to the frame 16 and at the other end to the header 14, as well as through a central upper link 20. The link 20 may take the form of a single double-acting hydraulic cylinder 21 whose extension and retraction is adjusted by the operator to remotely control the angle of the sickle bar 22 on the lower front of the header 14.

A single lift/cylinder 24, interconnecting the lower arm 18 and the frame 16 supports each side of the header, i.e., each side of the header is supported by its own lift/flotation cylinder (again, only the left one being shown in FIG. 1a).

More particularly, the control system accomplishes a single control function, i.e. the lift/flotation cylinders. It is, at this point, useful to understand that within the operator's cap of windrower 10 there is located a multifunction handle ("MFH"), such as shown as element 54 in FIG. 1b, to function as part of the overall implement control system, MFH 54 may be located within or closely adjacent to the console, in a convenient position to the operator's right hand, and may serve as the operator's input to control and manage direction and speed of travel, header height, reel speed, raise and drop rates, various inputs to electronic control unit ("ECU") 50, and the like. The MFH shown is similar to that shown in more detail in U.S. Pat. No. 6,148,593, issued to Heinsey et al. on Nov. 21, 2000. The MFH of FIG. 1b would necessarily have at the very least, a switching device, such as rocker switch 55 to move a cursor up and down a list of menu items on a display, plus at least one selection button, such as switch 57.

Directing attention now to FIG. 2, the hydraulic control system for left cylinder 24 and right cylinder 26 can be seen to include an electro-hydraulic subsystem generally depicted as 30. For convenience of assembly and operation, the majority of the components may be housed in a single valve body 34 with appropriately located ports and other necessary connection devices and fixtures. A fixed displacement pump 36 moves the hydraulic fluid into subsystem 30 from reservoir 40, through the various circuits as directed by control valves, to a single accumulator 42, to hydraulic cylinders 24, 26 and back to reservoir 40 as appropriate.

While FIG. 2 should be readily understood by one of skill in the art, it is helpful to broadly identify the various components in more detail. A PRV (pressure reducing valve) 44 operates as part of the hydraulic counterweight process, to be described further below. Element 39 is a master solenoid valve with an associated relief valve 43. A PRV 44 for the lift/flotation and drop rate functions is in flow communication with the lower solenoid valve 46, the raise solenoid valve 48, and the float solenoid valve 49.

Figure 3:
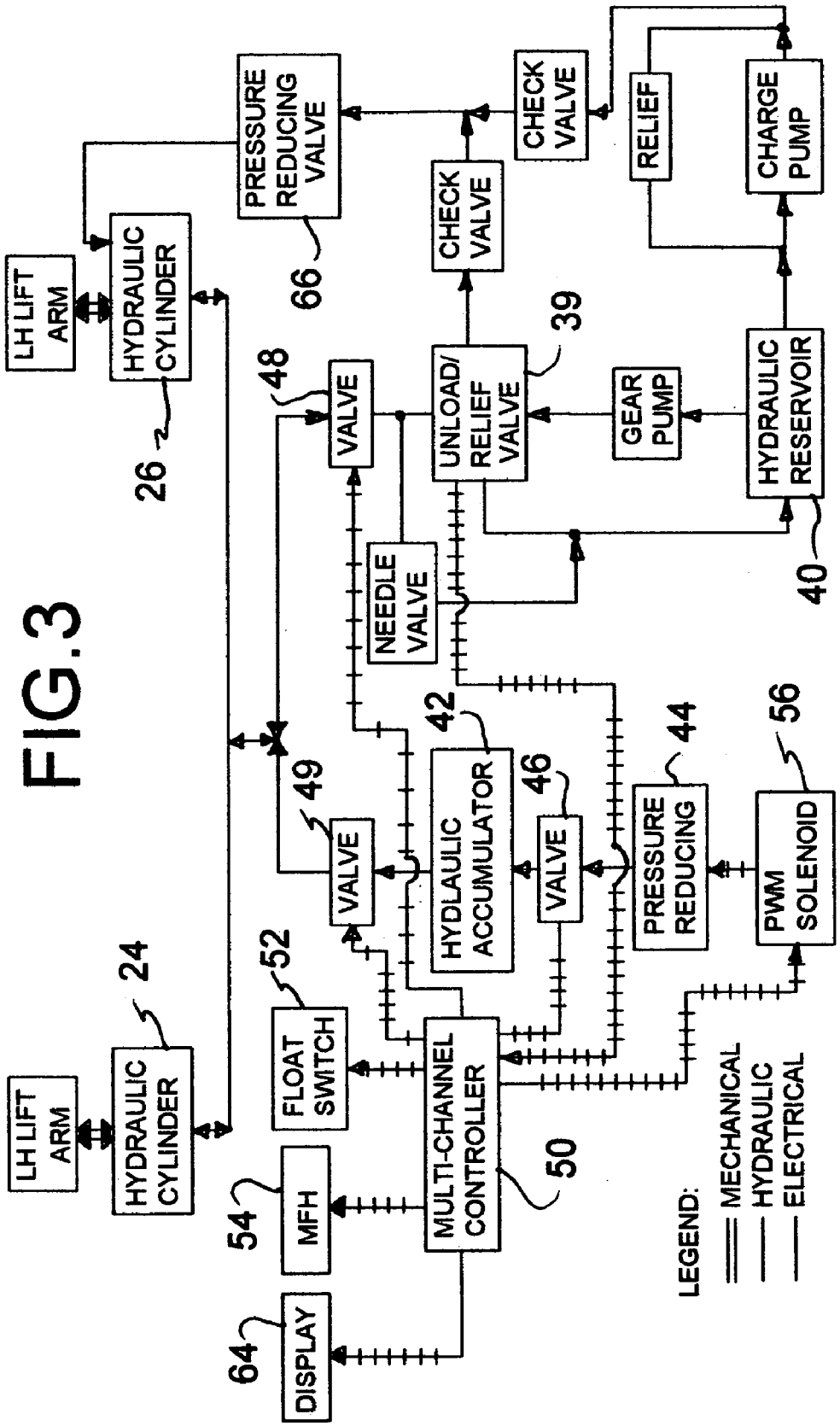
FIG. 3 is a schematic of exemplary hydraulic, mechanical and electrical subsystems that cooperate to produce the system of FIGS. 1 and 2.

FIG. 3 provides a more detailed depiction of the compete control system and subsystems. The hydraulic system, as shown also in FIG. 2, additionally depicts the electrical control and mechanical subsystems. Importantly, this figure depicts the ECU 50 which exchanges electrical signals from the float switch 52, the PWM (pulse width modulated) solenoid 56 associated with PRV 44, the master valve 39, and other valves to manage the lift and flotation functions as established by the operator through the appropriate switch and shown on display 64. Also depicted in FIG. 3 is MFH 54.

The hydraulic cylinders, attached to respective ends of the header 14, perform both the lift and flotation functions. The lifting and floating function is achieved by coupling the lifting end of the hydraulic cylinders to each other and then to a hydraulic pump, control manifold, and accumulator. The operator sets the desired flotation force by actuating a rocker switch located on the operator's console or the MFH. One switch position allows hydraulic oil to enter the accumulator (increasing the hydraulic pressure), which reduces the header contact force, or flotation force, with the ground. The other switch position allows oil to exit the accumulator (reducing the hydraulic pressure), which increases the header contact force with the ground. Once the flotation force is set, the control valves will return to this present flotation condition whenever the float mode is selected, irrespective of subsequent header lift and lower operations.

To accommodate unbalanced headers (the header center of gravity is not centered between the lift arms), hydraulic oil is applied to the return side of the lift cylinder on the lighter side of the header. The addition of a defined hydraulic pressure on the back side of the cylinder results in the same lifting pressure to be required for each side. The header will then raise, lower, and float evenly. The result is the same as changing the lift geometry or adding ballast to the header. This function is referred to as the "hydraulic counterweight".

Hydraulic oil is supplied from the hydraulic ground drive charge pump, which provides constant pressure any time the engine is running. To prevent cavitation of the charge pump during rapid changes in system volume, such as during the header lower cycle, makeup oil is supplied from the header lift pump. The operator sets the hydraulic counterweight by energizing valve 38 to apply more weight (hydraulic pressure) to the light side of the header until the header raises and lowers to a level condition. If too much weight is applied, the operator simply energizes the valve in the opposite direction. Once the correct setting is established, the hydraulic counterweight will not need to be readjusted during machine operation. Re-adjustment will only become necessary if the header builds up with debris or upon exchange with another header.

For headers that experience severe changes in balance during normal operations, e.g., draper headers with deck-shift, an electro-hydraulic valve can be installed in place of the manual control valve. This electro-hydraulic valve is adjusted from a rocker switch on the operator's console or the MFH. The operator then sets the hydraulic counterweight for each deck position. Once these valves are established, the control valve will adjust automatically and the deck positions are selected.

Referring to FIGS. 2 and 3, to adjust or control the header drop rate to fit the header configuration and weight ECU 50 manipulates the various components in a sequenced and timed manner as dictated by the programming within ECU 50. Taking the header lowering cycle to be four seconds (or very nearly four seconds), the starting time, i.e., where time=0.00, is the point at which the operator presses the switch to lower the header. This switch could be either on the console or on the MFH. Thereafter, the following sequence and steps take place:

t=0.00

The hydraulic master valve 39 is energized to pressurize the system.

PRV 44 is energized with a valve equal to the flotation valve plus the offset value (drop speed value).

Relief value 43 is set at approximately 3400 psi.

t=0.33

Master valve 39 is maintained at 100%.

PRV 44 current is maintained at value of flotation plus offset value.

Lower solenoid valve 46 and float solenoid valve 49 are fully energized to lower the header through the PRV valve 44.

t=2.33

Master valve 39 is maintained at 100%.

Current to PRV 44 is modified to equal flotation value only.

Lower solenoid valve 46 and float solenoid valve 49 continue to be fully energized.

t=3.83

Master valve 39 is maintained at 100%.

Current to PRV 44 is maintained at flotation value.

Lower solenoid valve 46 is deenergized to isolate the accumulator and lift cylinders from PRV valve 44.

Float solenoid valve 49 continues to be energized to keep the accumulators in the circuit with the hydraulic lift cylinders.

t=4.08

Master valve 39 is deenergized, reducing pressure to zero. Current to PRV 44 is maintained at flotation value.

Float solenoid valve 49 continues to be energized to keep the accumulators in the circuit with the header lift cylinders.

In making the adjustments for different headers and drop rates, the only thing that changes, if the drop rate is something other than zero, is the current applied to PRV 44. So, for the first two seconds, PRV 44 is energized with the current necessary for the flotation setting plus a small offset value for drop rate. Then, for the last two seconds, the PRV is energized with the current necessary for the flotation setting. If the drop rate is set at zero, there is no modification to the PRV current—it remains the same.

Figure 4:
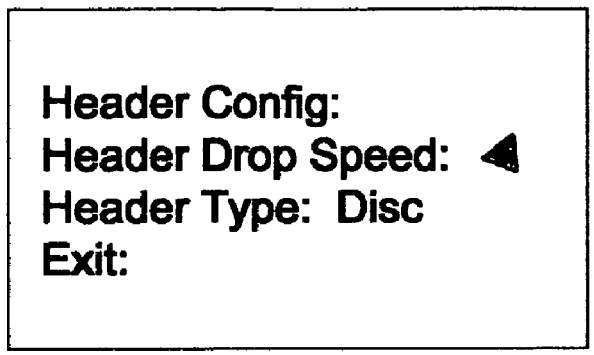
FIGS. 4a–4e are various depictions of visual outputs on a display unit.
Figure 4:
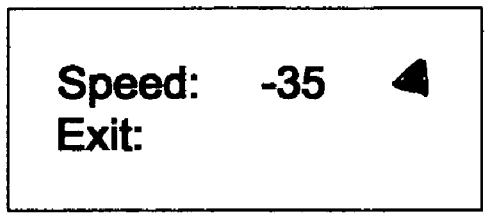
Figure 4:
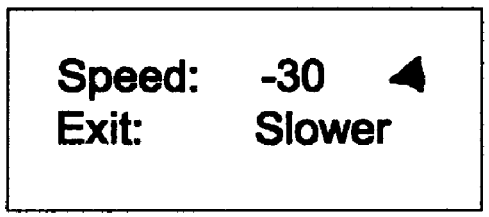
Figure 4:
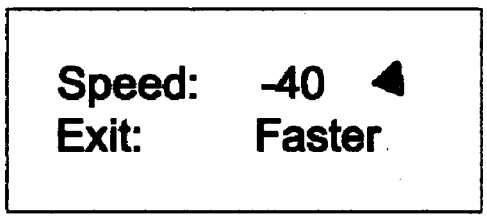
Figure 4:
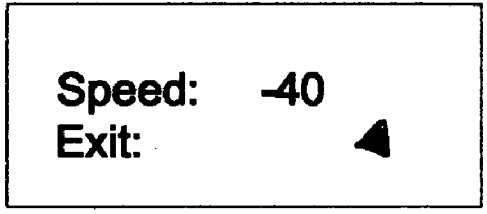

The setup process for operation of the windrower includes a series of options that appear on the visual display at the command of the operator and through his manipulation of various input devices. The menu significant to the present invention is the Header Configuration menu, shown in FIG. 4a. "Header Drop Speed" ("speed" and "rate" having the same meaning herein) is one of the menu items that may be selected by moving the cursor in any of a number of ways, as by manipulation of multi-position rocker switch 55 in FIG. 1b. A particular menu item is then selected by another switch, such as switch 57 in FIG. 1b (however, there are switches that can perform both functions, viz., cursor movement and item selection). When "Header Drop Speed" is selected, a second display appears, like FIG. 4b, showing the presently set drop speed, in this example "−35". By manipulation of either another switch that may, for example, show a "+" or "−" sign, the rate changes on the display. In this example, the value is changed in increments of 5, though this incremental amount is not significant so long as it is not so large as to make fine adjustment difficult. At the same time that the drop speed is changed, the display indicates whether the change is speeding or slowing the drop rate (see FIGS. 4c and 4d). When the desired speed is reached, the cursor is moved to "Exit" and the selection is made to move on to further setup operations. The minus (−) sign shown on the display before the drop speed indicates a negative offset that is to be subtracted from the flotation set point. The lesser (algebraically smaller) the number, the lower the pressure, the faster the drop speed. If the number is preceded by a plus (+) sign, which indicates a positive offset that is added to the flotation set point, adjusting the pressure higher so that the drop speed would be slower.

It will be understood that changes in the details, materials, steps and arrangements of parts which have been described and illustrated to explain the nature of the invention will occur to and may be made by those skilled in the art upon a reading of this disclosure within the principles and scope of the invention. For example, a touch screen visual display could be used, thus making the screen a primary input device. The foregoing description illustrates the preferred embodiment of the invention; however, concepts, as based upon the description, may be employed in other embodiments without departing from the scope of the inventions.

What is claimed is:

1. A method of controlling a drop rate of an agricultural header comprising the steps of:

providing a self-propelled agricultural implement having a wheel-supported main frame, an engine supported on the main frame, a drive train connected to the engine and providing motive power to the wheels, a crop-engaging header supported on the main frame transversely to the direction of travel of the implement for harvesting crop material from the ground, the header adapted for vertical movement, an operator's cab supported on the main frame and having controls therein for the engine, drive train, header and other components;

providing an electronic control unit (ECU) with a memory and programmable signal processing capabilities;

providing a visual display device receiving signals from the ECU to dictate the content of the visual output of the display device, the content listing information and alternative choices to the operator in the form of a menu;

providing an input device within the operator's cab connected to the ECU for sending signals to the ECU representing input selections of the operator from the menu on the display device, those input signals resulting in output signals from the ECU to the display device and dictating other visual output on the display device;

providing an hydraulic header lift and flotation system with hydraulic circuitry having a plurality of valves of various types including a master solenoid valve, a pressure reduction solenoid valve (PRV), a raise solenoid valve, a lower solenoid valve and a float solenoid valve, all connected to the ECU for receiving variable control signals from the ECU to raise and lower the header relative to the ground and manage the header flotation characteristics, the hydraulic circuitry further including header lift cylinders, an accumulator and a reservoir;

selecting the drop rate by operator manipulation of the input device in conjunction with observation of visual outputs on the display device, and inputting that selection to the ECU in the form of an output drop rate signal;

initiating the lower header cycle with a signal from an operator-activated switch sending a lower header signal to the ECU;

via signals from the ECU, pressurizing the header lift and flotation system by energizing the master solenoid valve to 100% and the PRV with current necessary for flotation plus a value for the drop rate corresponding to the output drop rate signal;

approximately one-third of a second later, via signals from the ECU, energizing the lower and float solenoid valves to initiate the flow of hydraulic fluid from the header lift cylinders through the lower solenoid valve to the reservoir;

approximately two seconds later, via signals from the ECU, modifying the current to the PRV to equal the flotation value only to continue the lowering of the header;

approximately 1.5 seconds later, via signals from the ECU, deenergizing the lower solenoid valve to isolate the accumulator and lift cylinders from the PRV; and approximately one-quarter second later, via signals from the ECU, deenergizing the master solenoid valve.

2. The method of claim 1, wherein:

the input device within the operator's cab is a multifunction (MFH) with at least a one directional switch for inputting signals to the ECU to move a cursor around the visual display device from one menu item to another.

3. The method of claim 2, wherein:
the input device within the operator's cab has at least one selection switch for selecting individual items on a menu.

4. The method of claim 1, wherein:
the agricultural implement is a windrower.

5. The method of claim 3, wherein:
the agricultural implement is a windrower.

6. The method of claim 5, wherein:
the step of selecting the drop rate includes the further step of:
by operator manipulation of the input device in conjunction with observation of a plurality of successive menu listings and selection from this plurality of menu listings on the display device.

7. A method of controlling the drop rate of an agricultural header comprising the steps of:
providing a self-propelled agricultural implement having a wheel-supported main frame, an engine supported on the main frame, a drive train connected to the engine and providing motive power to the wheels, a crop-engaging header supported on the main frame transversely to the direction of travel of the implement for harvesting crop material from the ground, the header adapted for vertical movement, an operator's cab supported on the main frame and having controls therein for the engine, drive train, header and other components;
providing an electronic control unit(ECU) with a memory and programmable signal processing capabilities;
providing a visual display device for receiving signals from the ECU to dictate the content of the visual output of the display device, the content listing information and alternative choices to the operator in the form of a menu, the display device including a touch screen whereby selections are made by the operator's fingers, the screen thus sending signals to the ECU representing input selections of the operator from the menu on the display device, those input signals resulting in output signals from the ECU to the display device and dictating other visual output on the display device;
providing an hydraulic header lift and flotation system with hydraulic circuitry having a plurality of valves of various types including a master solenoid valve, a pressure reduction solenoid valve (PRV), a raise solenoid valve, a lower solenoid valve and a float solenoid valve, all connected to the ECU for receiving variable control signals from the SCU to raise and lower the header relative to the ground and manage the header flotation characteristics, the hydraulic circuitry further including header lift cylinders, an accumulator and a reservoir;
selecting the drop rate by operator manipulation of the input device in conjunction with observation of visual outputs on the display device, and inputting that selection to the ECU in the form of an output drop rate signal;
initiating the lower header cycle with a signal from the touch screen as a result of the operator making a selection on the screen and sending a lower header signal to the ECU;
via signals from the ECU, pressurizing the header lift and flotation system by energizing the master solenoid valve to 100% and the PRV with current necessary for flotation plus a value for the drop rate corresponding to the output drop rate signal;
approximately one third of a second later, via signals from the ECU, energizing the lower and float solenoid valves to initiate the flow of hydraulic fluid from the header lift cylinders through the lower solenoid valve to the reservoir;
approximately two seconds later, via signals from the ECU, modifying the current to the PRV to equal the flotation valve only to continue the lowering of the header;
approximately 1.5 seconds from the ECU, deenergizing the lower solenoid valve to isolate the accumulator and lift cylinders from the PRV; and
approximately one-quarter second later, via signals from the ECU, deenergizing the master solenoid valve.

8. The method of claim 7, wherein:
the agricultural implement is a windrower.

9. The method of claim 8, wherein:
the step of selecting the drop rate includes the further step of:
by operator manipulations of the input device in conjunction with observation of a plurality of successive menu listings and selection from this plurality of menu listings on the display device.

* * * * *